(12) United States Patent
Sandoval

(10) Patent No.: US 10,112,557 B2
(45) Date of Patent: Oct. 30, 2018

(54) THERMALLY COMPLIANT GROMMET ASSEMBLY

(71) Applicant: United Technologies Corporation, Hartford, CT (US)

(72) Inventor: Jonathan P. Sandoval, Hebron, CT (US)

(73) Assignee: United Technologies Corporation, Farmington, CT (US)

( * ) Notice: Subject to any disclaimer, the term of this patent is extended or adjusted under 35 U.S.C. 154(b) by 464 days.

(21) Appl. No.: 14/678,437

(22) Filed: Apr. 3, 2015

(65) Prior Publication Data
US 2015/0285497 A1 Oct. 8, 2015

Related U.S. Application Data

(60) Provisional application No. 61/974,782, filed on Apr. 3, 2014.

(51) Int. Cl.
*B60R 16/02* (2006.01)
*F02C 7/18* (2006.01)
(Continued)

(52) U.S. Cl.
CPC ...... *B60R 16/0222* (2013.01); *B60R 16/0215* (2013.01); *F02C 7/18* (2013.01);
(Continued)

(58) Field of Classification Search
CPC ............. B60R 16/0215; B60R 16/0222; F16B 5/0258; F16L 5/10; H01B 17/58;
(Continued)

(56) References Cited

U.S. PATENT DOCUMENTS 3,506,999 A * 4/1970 Neher ....................... B66B 7/06
16/2.1
4,132,066 A * 1/1979 Austin, Jr. ................ F23R 3/06
60/752
(Continued)

FOREIGN PATENT DOCUMENTS

GB 2353589 2/2001

OTHER PUBLICATIONS

EP search report for 15162657.9 dated Jul. 29, 2015.

*Primary Examiner* — Jeffrey O'Brien
(74) *Attorney, Agent, or Firm* — O'Shea Getz P.C.

(57) ABSTRACT

A thermally compliant grommet assembly for a combustor includes first and second shells spaced apart from one another and a grommet having a tubular portion projecting into a hole in the second shell and defining a bore in fluid communication through the first and second shells. The grommet further has an oblong flange portion extending circumferentially around and projecting outward from the tubular portion. The oblong flange portion is located between and is in sealing contact with the first and second shells. At least one of the first and second shells is constructed and arranged to move between cold and hot states and generally along a thermal displacement path. The oblong flange portion is generally elongated along the path to maintain sealing contact with at least one of the shells as the shells move between the hot and cold states.

10 Claims, 5 Drawing Sheets

(51) Int. Cl.
  *F23R 3/00* (2006.01)
  *F28F 1/00* (2006.01)
  *F23R 3/04* (2006.01)

(52) U.S. Cl.
  CPC .............. *F23R 3/002* (2013.01); *F23R 3/045* (2013.01); *F28F 1/00* (2013.01); *Y02T 50/675* (2013.01); *Y10T 16/088* (2015.01)

(58) Field of Classification Search
  CPC ....... H02G 3/083; Y10T 16/05; Y10T 16/053; Y10T 16/075; Y10T 16/082; Y10T 16/088
  See application file for complete search history.

(56) References Cited

U.S. PATENT DOCUMENTS

| | | | | |
|---|---|---|---|---|
| 4,134,175 A * | 1/1979 | Contoyanis | ............. | F16C 33/08 16/2.1 |
| 4,685,172 A * | 8/1987 | O'Connor | ............... | F16C 35/04 16/2.1 |
| 4,805,397 A * | 2/1989 | Barbier | .................. | F23R 3/045 60/759 |
| 4,850,397 A | 2/1989 | Barbier et al. | | |
| 4,927,306 A * | 5/1990 | Sato | ..................... | F16B 33/004 411/182 |
| 5,144,793 A * | 9/1992 | Able | ....................... | F23R 3/045 60/757 |
| 5,560,197 A * | 10/1996 | Ansart | .................... | F02K 1/822 60/752 |
| 6,088,874 A * | 7/2000 | Nakata | ...................... | F16L 5/10 16/2.1 |
| 7,246,411 B2 * | 7/2007 | Campbell | ............ | E05D 15/0682 16/2.1 |
| 8,931,137 B2 * | 1/2015 | Daniel | .................... | F41C 27/00 16/2.1 |
| 2002/0189260 A1 * | 12/2002 | David | ..................... | F23R 3/045 60/746 |
| 2010/0186416 A1 * | 7/2010 | Chen | ........................ | F23R 3/06 60/755 |
| 2012/0248285 A1 * | 10/2012 | Mitsch | .................. | F16F 1/3863 248/636 |
| 2012/0297778 A1 * | 11/2012 | Rudrapatna | ............. | F23R 3/045 60/755 |
| 2013/0025288 A1 * | 1/2013 | Cunha | .................... | F23R 3/002 60/772 |
| 2013/0255269 A1 * | 10/2013 | McKenzie | .............. | F23R 3/007 60/772 |
| 2014/0225367 A1 * | 8/2014 | Vu | ............................. | F16L 5/10 285/345 |
| 2015/0369269 A1 * | 12/2015 | Holt | ....................... | F16B 5/0241 411/108 |
| 2016/0327271 A1 * | 11/2016 | Sandoval | ................ | F23R 3/045 |

\* cited by examiner

THERMALLY COMPLIANT GROMMET ASSEMBLY

This application claims priority to U.S. Patent Appln. No. 61/974,782 filed Apr. 3, 2014.

BACKGROUND

The present disclosure relates to a combustor and, more particularly, to a grommet assembly for a combustor of a gas turbine engine.

Gas turbine engines, such as those that power modern commercial and military aircraft, include a fan section to propel the aircraft, a compressor section to pressurize a supply of air from the fan section, a combustor section to burn a hydrocarbon fuel in the presence of the pressurized air, and a turbine section to extract energy from the resultant combustion gases and generate thrust.

The combustor section typically includes a wall assembly having an outer shell lined with heat shells that are often referred to as floatwall panels. Together, the panels define a combustion chamber. A plurality of dilution holes are generally spaced circumferentially about the wall assembly and flow dilution air from a cooling plenum and into the combustion chamber to improve emissions, and reduce and control the temperature profile of combustion gases at the combustor outlet to protect the turbine section from overheating.

The dilution holes are generally defined by a grommet that extends between a heat shell panel and supporting shell with a cooling cavity defined therebetween. Improvements to the grommet including weight and thermal mass reduction is desirable.

SUMMARY

A grommet for a combustor according to one, non-limiting, embodiment of the present disclosure includes a tubular portion defining a bore having a centerline; and a truncated flange portion surrounding and projecting outward from tubular portion.

Additionally to the foregoing embodiment, the tubular portion has a distal rim projecting outward from the truncated flange portion.

In the alternative or additionally thereto, in the foregoing embodiment, the truncated flange portion has first and second segments that are substantially opposite to one-another, and third and fourth segments that are substantially opposite to one-another and generally project further outward from the tubular portion than the first and second segments.

In the alternative or additionally thereto, in the foregoing embodiment, the truncated flange portion has a circumferentially continuous peripheral face carried by the first, second, third and fourth segments, and wherein the face at the third and fourth segments is substantially planar.

In the alternative or additionally thereto, in the foregoing embodiment, the peripheral face at at least one of the first and second segments has a radius of curvature with respect to the centerline.

A grommet assembly according to another, non-limiting embodiment, includes, a first shell; a second shell spaced from the first shell and including a hole having a centerline; and a grommet including a tubular portion projecting into the hole and defining a bore along a centerline through the first and second shells, wherein at least one of the first and second shells are configured for relative movement along a thermal displacement path such that the centerlines of the hole of the second shell and the bore of the grommet move relative to one another along the thermal displacement path.

Additionally to the foregoing embodiment, the centerlines are substantially parallel to one-another.

In the alternative or additionally thereto, in the foregoing embodiment, the centerlines are substantially nominal to the thermal displacement path.

In the alternative or additionally thereto, in the foregoing embodiment, the grommet includes a truncated flange portion disposed between the first and second shells and projecting outward from the tubular portion.

In the alternative or additionally thereto, in the foregoing embodiment, the truncated flange portion is in sliding and circumferentially continuous, sealing, contact with the second shell during relative movement of the first and second shells between cold and hot states.

In the alternative or additionally thereto, in the foregoing embodiment, the grommet is rigidly engaged to the first shell.

In the alternative or additionally thereto, in the foregoing embodiment, a continuous surface carried by the second shell defines a second hole and is spaced radially outward from the tubular portion when at least one of the first and second shells are in the cold and hot states.

In the alternative or additionally thereto, in the foregoing embodiment, the grommet is a dilution hole grommet and the bore is a dilution hole.

In the alternative or additionally thereto, in the foregoing embodiment, the flange portion extends continuously around the tubular portion.

In the alternative or additionally thereto, in the foregoing embodiment, the flange portion has truncated first and second segments that are substantially opposite to one-another and extend outward substantially normal to the thermal displacement path, and third and fourth segments that are substantially opposite to one-another, extend along the thermal displacement path, and generally project further outward from the tubular portion than the first and second segments.

In the alternative or additionally thereto, in the foregoing embodiment, a continuous surface carried by the second shell defines the hole and has a radius measured from the centerline of the hole, wherein the flange portion includes a circumferentially continuous outer face between the first and second shells and carried by the first, second, third and fourth segments, and wherein a minimum distance between a portion of the face carried by one of the truncated first and second segments and the centerline of the bore is less than the radius.

In the alternative or additionally thereto, in the foregoing embodiment, the radius exceeds the minimum distance by at least a maximum offset distance between the first and second centerlines during relative movement of the first and second shells along the thermal displacement path.

A combustor according to another, non-limiting, embodiment includes a support shell including a hole having a first centerline; a heat shell having a hot side defining at least in-part a boundary of a combustion chamber, and an opposite cold side, wherein a cooling cavity is defined between the support shell and the cold side; and a grommet having a tubular portion extending through the hole and defining a dilution hole having a second centerline and in fluid communication with the combustion chamber, and a flange portion projecting radially outward from the tubular portion and located in the cooling cavity, at least one of the support shell and the heat shell is configured to move along a thermal displacement path between a cold state and a hot state such that the flange is elongated along the thermal displacement path.

Additionally to the foregoing embodiment, the combustor includes a kingpin engaged between the support and heat shells, wherein the thermal displacement path is linear and generally extends through the kingpin.

In the alternative or additionally thereto, in the foregoing embodiment, the flange is in sliding and circumferentially continuous, sealing, contact with the second shell during relative movement of the first and second shells between the cold and hot states.

The foregoing features and elements may be combined in various combination without exclusivity, unless expressly indicated otherwise. These features and elements as well as the operation thereof will become more apparent in light of the following description and the accompanying drawings. It should be understood, however, the following description and figures are intended to exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
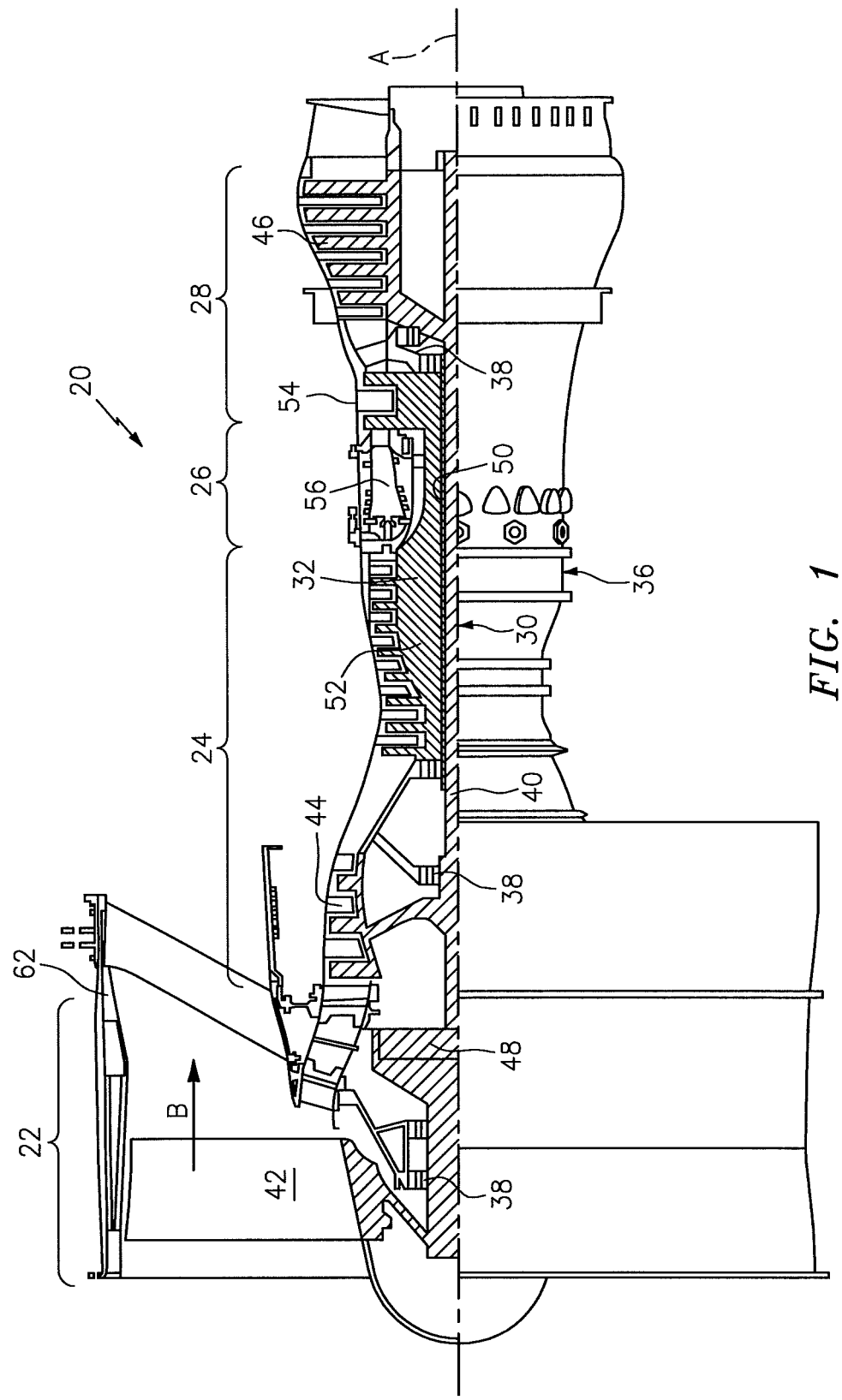
FIG. 1 is a schematic cross-section of a gas turbine engine.

FIG. 1 schematically illustrates a gas turbine engine 20 disclosed as a two-spool turbo fan that generally incorporates a fan section 22, a compressor section 24, a combustor section 26 and a turbine section 28. Alternative engines may include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engine architecture such as turbojets, turboshafts, and three-spool turbofans with an intermediate spool.

The engine 20 generally includes a low spool 30 and a high spool 32 mounted for rotation about an engine axis A via several bearing structures 38 and relative to a static engine case 36. The low spool 30 generally includes an inner shaft 40 that interconnects a fan 42 of the fan section 22, a low pressure compressor 44 ("LPC") of the compressor section 24 and a low pressure turbine 46 ("LPT") of the turbine section 28. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") of the compressor section 24 and a high pressure turbine 54 ("HPT") of the turbine section 28. A combustor 56 of the combustor section 26 is arranged between the HPC 52 and the HPT 54. The inner shaft 40 and the outer shaft 50 are concentric and rotate about the engine axis A. Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds that can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting example, the bypass ratio of the gas turbine engine 20 is greater than about ten (10:1); the fan diameter is significantly larger than the LPC 44; and the LPT 46 has a pressure ratio that is greater than about five (5:1). It should be understood; however, that the above parameters are only exemplary of one example of a geared architecture engine and that the present disclosure is applicable to other gas turbine engines including direct drive turbofans.

In one non-limiting example, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as Thrust Specific Fuel consumption (TSFC). TSFC is an industry standard parameter of fuel consumption per unit of thrust.

Fan Pressure Ratio is the pressure ratio across a blade of the fan section 22 without the use of a fan exit guide vane system. The low Fan Pressure Ratio according to one non-limiting example of the gas turbine engine 20 is less than 1.45:1. Low Corrected Fan Tip Speed is the actual fan tip speed divided by an industry standard temperature correction of $(T/518.7)$, where "T" represents the ambient temperature in degrees Rankine. The Low Corrected Fan Tip Speed according to one non-limiting example of the gas turbine engine 20 is less than about 1150 fps (351 m/s).

Figure 2:
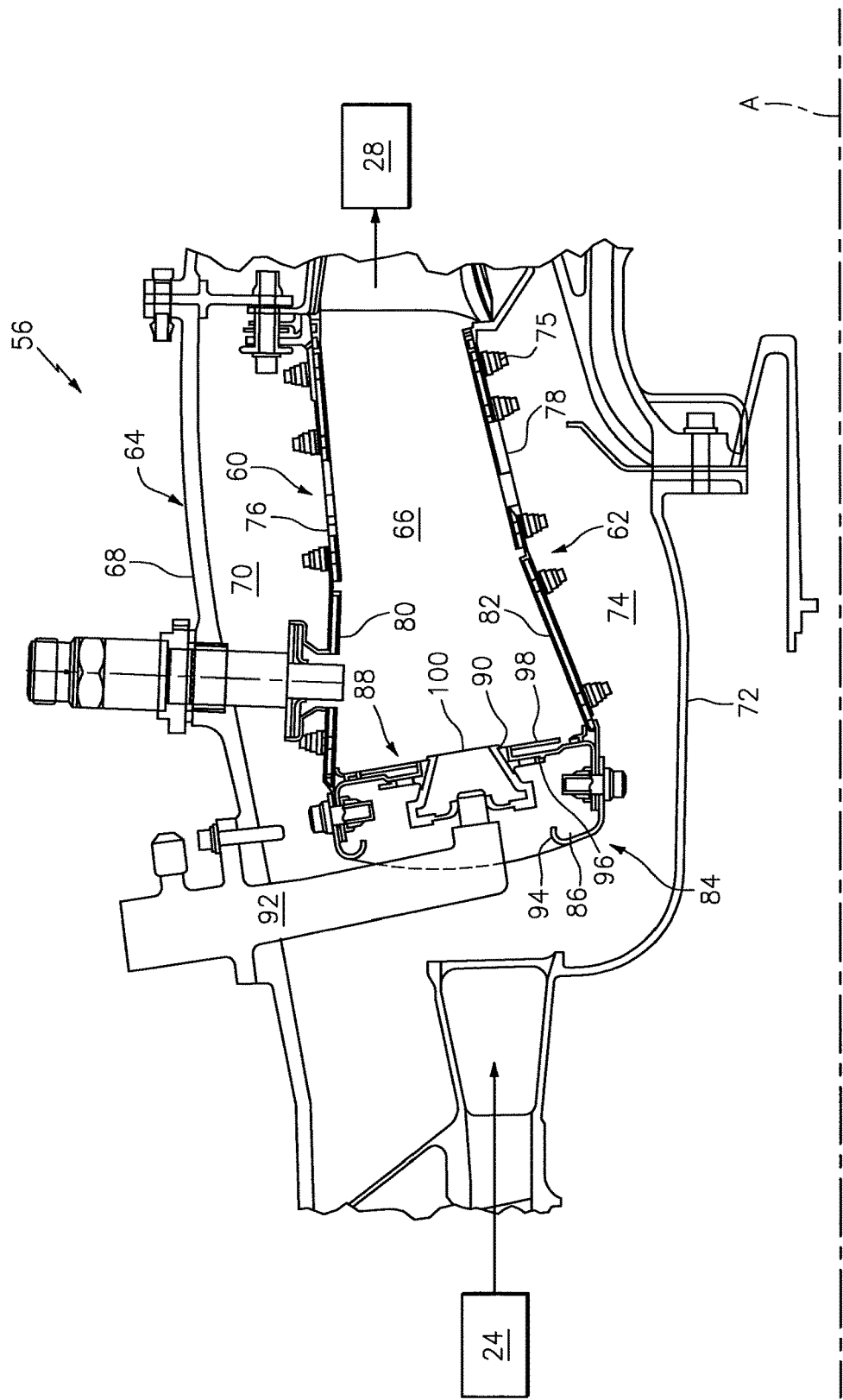
FIG. 2 is a cross-section of a combustor section.

Referring to FIG. 2, the combustor section 26 generally includes an annular combustor 56 with an outer combustor wall assembly 60, an inner combustor wall assembly 62, and a diffuser case module 64 that surrounds assemblies 60, 62. The outer and inner combustor wall assemblies 60, 62 are generally cylindrical and radially spaced apart such that an annular combustion chamber 66 is defined therebetween.

The outer combustor wall assembly 60 is spaced radially inward from an outer diffuser case 68 of the diffuser case module 64 to define an outer annular plenum 70. The inner wall assembly 62 is spaced radially outward from an inner diffuser case 72 of the diffuser case module 64 to define, in-part, an inner annular plenum 74. Although a particular combustor is illustrated, it should be understood that other combustor types with various combustor liner arrangements will also benefit. It is further understood that the disclosed cooling flow paths are but an illustrated embodiment and should not be so limited.

The combustion chamber 66 contains the combustion products that flow axially toward the turbine section 28. Each combustor wall assembly 60, 62 generally includes a respective support shell 76, 78 that supports one or more thermally resistant heat shells or liners 80, 82. Each of the heat shells 80, 82 may be formed of a plurality of floating panels that are generally rectilinear and manufactured of, for example, a nickel based super alloy that may be coated with a ceramic or other temperature resistant material, and are arranged to form a heat shell array mounted to the respective support shells 76, 78. The heat shells 80, 82 are supported to the respective support shells 76, 78 allowing for thermal expansion and/or displacement.

The combustor 56 further includes a forward assembly 84 that receives compressed airflow from the compressor section 24 located immediately upstream. The forward assembly 84 generally includes an annular hood 86, a bulkhead assembly 88, and a plurality of swirlers 90 (one shown). Each of the swirlers 90 are circumferentially aligned with one of a plurality of fuel nozzles 92 (one shown) and a respective hood port 94 to project through the bulkhead assembly 88. The bulkhead assembly 88 includes a bulkhead support shell 96 secured to the combustor wall assemblies 60, 62 and a plurality of circumferentially distributed bulkhead heat shells or panels 98 secured to the bulkhead support shell 96 around each respective swirler 90 opening. The bulkhead support shell 96 is generally annular and the plurality of circumferentially distributed bulkhead panels 98 are segmented, typically one to each fuel nozzle 92 and swirler 90.

The annular hood 86 extends radially between, and is secured to, the forward-most ends of the combustor wall assemblies 60, 62. Each one of the plurality of circumferentially distributed hood ports 94 receives a respective on the plurality of fuel nozzles 92, and facilitates the direction of compressed air into the forward end of the combustion chamber 66 through a swirler opening 100. Each fuel nozzle 92 may be secured to the diffuser case module 64 and projects through one of the hood ports 94 into the respective swirler 90.

The forward assembly 84 introduces core combustion air into the forward section of the combustion chamber 66 while the remainder of compressor air enters the outer annular plenum 70 and the inner annular plenum 74. The plurality of fuel nozzles 92 and adjacent structure generate a blended fuel-air mixture that supports stable combustion in the combustion chamber 66.

Figure 3:
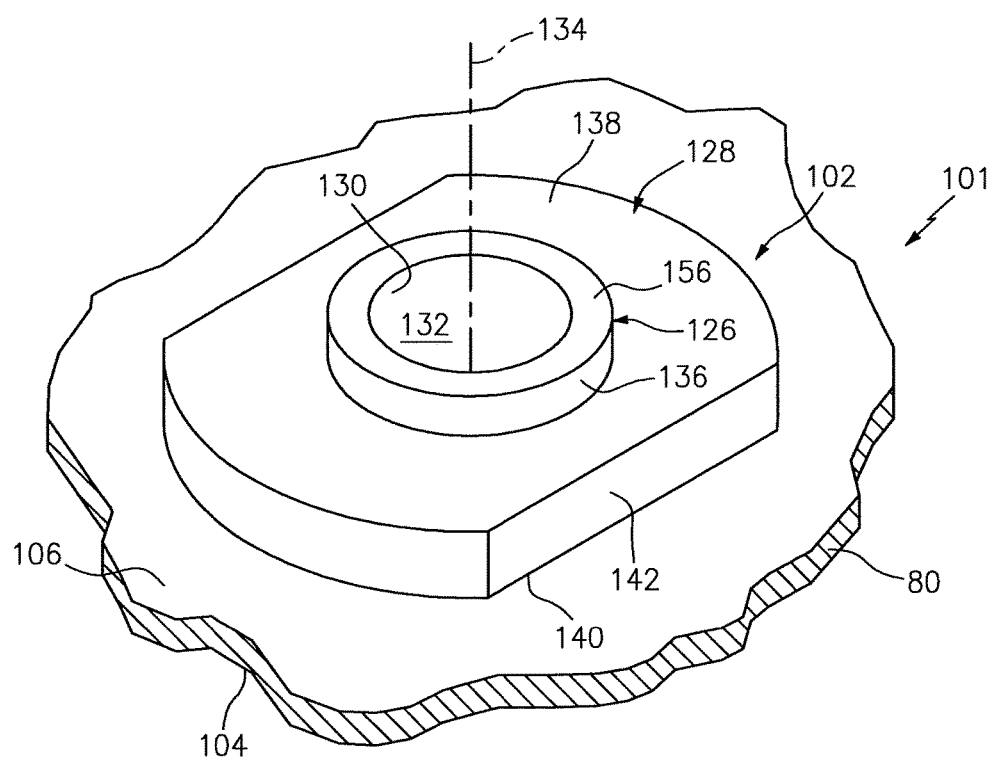
FIG. 3 is a perspective view of a thermally compliant grommet assembly with portions removed to show internal detail, according to one non-limiting example of the present disclosure.
Figure 4:
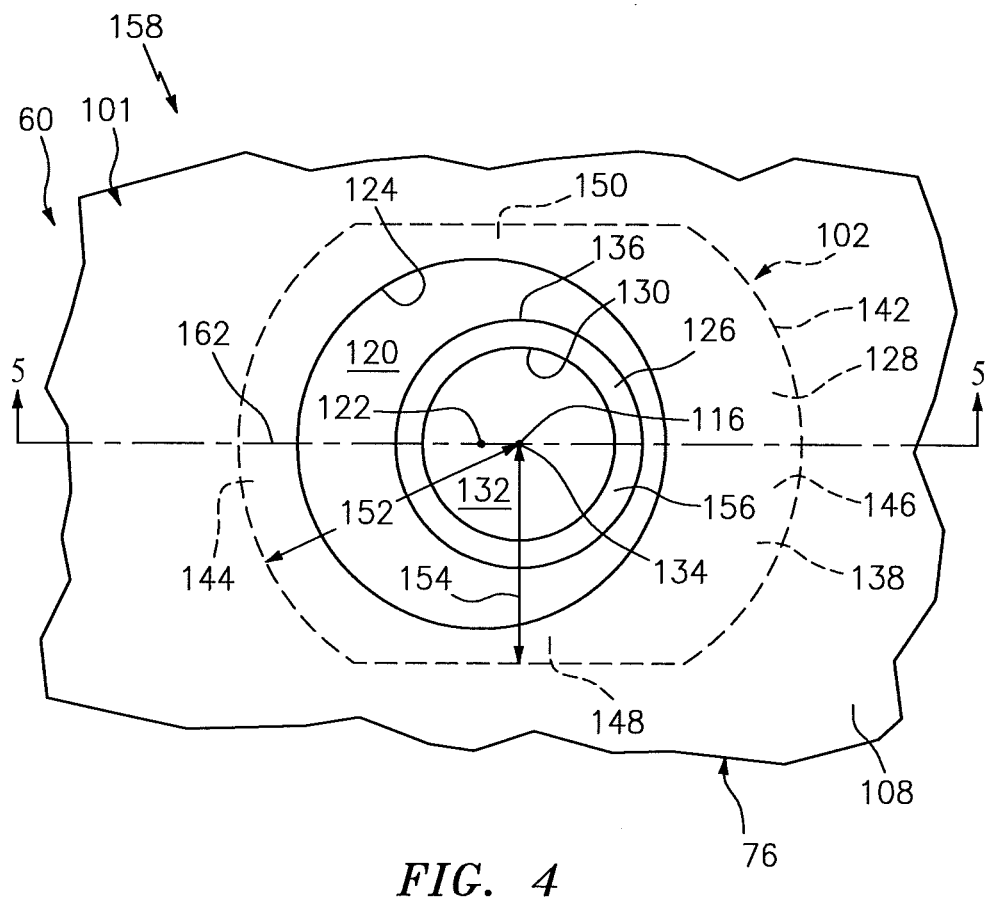
FIG. 4 is a plan view of the thermally compliant grommet assembly in a cold state.
Figure 5:
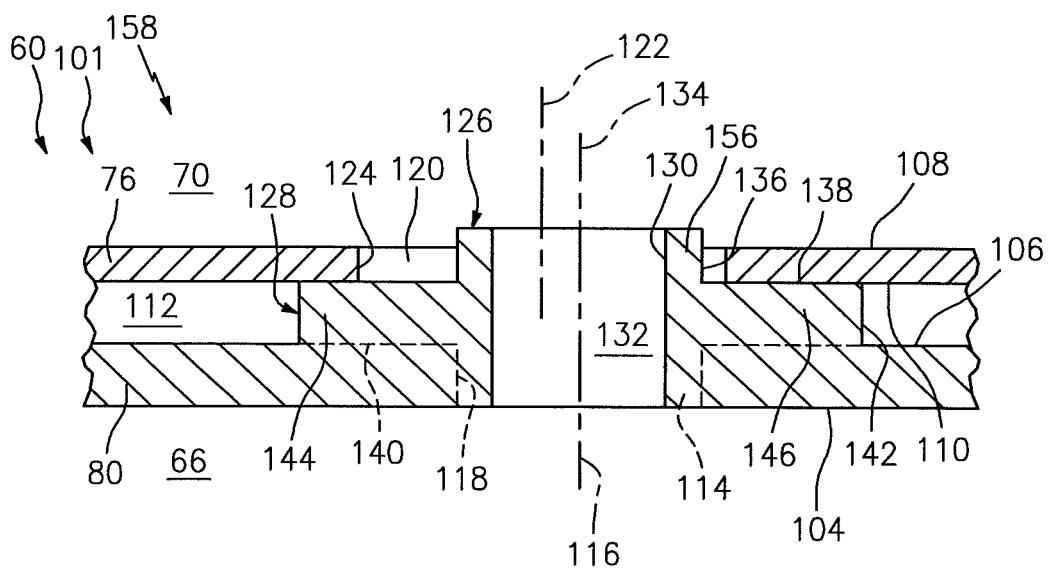
FIG. 5 is a cross section of the thermally compliant grommet assembly taken along line 5-5 of FIG. 4.

Referring to FIGS. 3 through 5, the wall assemblies 60, 62 of the combustor 56 have a plurality of grommet assemblies 101 (also referred to herein as 'thermally compliant grommet assemblies' 101 in the sense that the grommet 101 does not interfere with thermal displacement between the support and heat shells) that may each have a dilution hole grommet 102 associated with respective portions of the support shells 76, 78 and respective heat shells 80, 82. The grommet assemblies 101 are generally spaced circumferentially about the respective wall assemblies 60, 62. The grommets 102 inject dilution air from the outer and inner plenums 70, 74 and into the combustion chamber 66 to facilitate low emissions, and reduce and control the temperature profile of combustion gases at the combustor outlet to protect the HPT 54. To ensure a satisfactory temperature profile at the chamber 66 exit plane (i.e. exit flow cross-section), there must be adequate penetration of the dilution air, coupled with the correct number of dilution hole grommets 102 to form sufficient localized mixing zones. The penetration of dilution air from a round dilution hole is generally a function of its diameter. That is, if the total dilution-hole area is spread over a large number of small holes, penetration will be inadequate, and a hot core will persist through the dilution zone of the chamber 66. In the opposite extreme, the use of a small number of large holes will result in a cold core due to over-penetration and unsatisfactory mixing.

The grommet assembly 101 is illustrated and further described in relation to the outer wall assembly 60 for simplicity of explanation; however, it is understood that the same grommet assembly may be applied to the inner wall assembly 62 of the combustor 56. The heat shell 80 of wall assembly 60, which may include an array of panels, carries a hot side 104 that generally defines in-part a boundary of the combustion chamber 66 and an opposite cold side 106. The shell 76 carries an outer side 108 (FIG. 5) that faces and defines in-part a boundary of the cooling plenum 70 and an opposite inner side 110 that faces the cold side 106 of the heat shell 80. An annular cooling cavity 112 is located between and defined by the cold side 106 of the heat shell 80 and the inner side 110 of the shell 76.

A substantially round hole 114 having a centerline 116 communicates through the heat shell 80 and is defined by a continuous surface 118 carried by the heat shell 80 and spanning between the hot and cold sides 104, 106. Similarly, a substantially round hole 120 having a centerline 122 communicates through the shell 76 and is defined by a continuous surface 124 carried by the shell 76 and spanning between the outer and inner sides 108, 110.

The grommet 102 has a tubular portion 126 and a continuous flange portion 128. The tubular portion 126 has a continuous or cylindrical inner surface 130 that defines a dilution hole or bore 132 having a centerline 134, and an opposite outer surface 136. The flange portion 128 projects radially outward from, and continuously around, the outer surface 136 of the tubular portion 126 and is generally located in the cooling cavity 112. The flange portion 128 has an outer surface 138, an opposite inner surface 140, and a continuous peripheral or distal face 142 that spans axially, with respect to centerline 134, between the surfaces 138, 140. The opposite surfaces 138, 140 may be substantially parallel to one-another and substantially normal to centerline 134. The centerlines 116, 122, 134 may be substantially parallel to one-another, normal to the wall assembly 60, and may intersect the engine axis A.

The flange portion 128 is generally truncated and may include diametrically opposite segments 144, 146 and diametrically opposite, truncated, segments 148, 150 that all project radially between the common distal peripheral face 142 and the outer surface 136 of the tubular portion 126. The segment 144 spans circumferentially between and engages, or forms into, the adjacent segments 148, 150; and similarly, the segment 146 spans circumferentially between and forms into the adjacent segments 148, 150. The portion of the peripheral face 142 at the opposite segments 144, 146 may be generally cylindrical having a radius 152 measured from about the centerline 134 to the face 142. The portion of the peripheral face 142 at the truncated segments 148, 150 may be substantially planar (i.e. flat edges) and parallel to one-another having a minimum distance 154 measured normal to the face 142, and between the centerline 134 and the face 142. The radius 152 of the segments 144, 146 is greater than the minimum distance 154 of the segments 148, 150.

When the grommet assembly 101 is fully assembled, the surface 138 of the flange portion 128 is in sliding contact with the inner side 110 of the support shell 76. The opposite surface 140 of the flange portion 128 may be cast, brazed, or otherwise secured to the cold side 106 of the heat shell 80 and a portion of the outer surface 136 of the tubular portion 126 may be cast, brazed, or otherwise secured to the surface 118 of the heat shell 80. With this rigid engagement of the grommet 102 to the heat shell 80, the centerline 116 of the heat shell 80 co-extends with the centerline 134 of the grommet 102. Also when assembled, a distal rim 156 of the tubular portion 126 projects axially from the surface 138 of the flange portion 128 and into the hole 120 in the support shell 76 such that the outer surface 136 of the tubular portion 126 is continuously spaced radially from and opposes the surface 124 carried by the support shell 76. It is further contemplated and understood that the grommet 102 may be assembled or installed without being rigidly attached to the heat shell 80, and may instead float between the shells 76, 80 via the flange portion 128. If floating, it is further understood that the grommet 102 may have limited movement with respect to the heat shell 80 and thus the centerline 116 of the heat shell 80 may not necessarily co-extend with the centerline 134 of the grommet 102.

Figure 6:
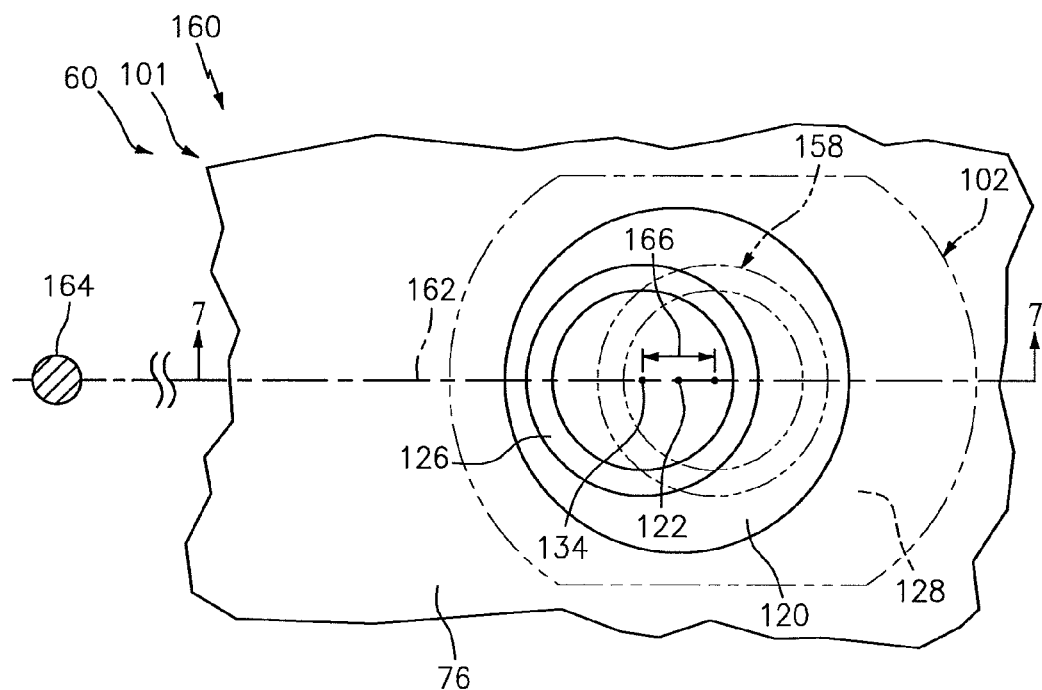
FIG. 6 is a plan view of the thermally compliant grommet assembly in a hot state.
Figure 7:
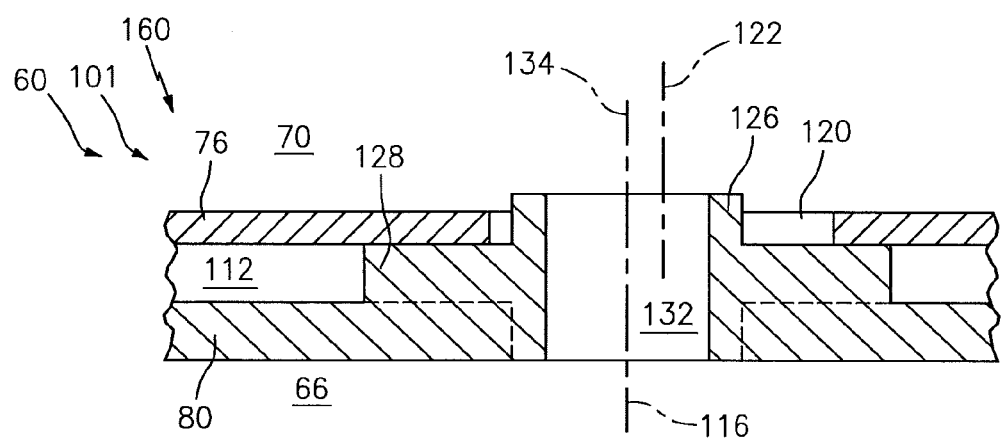
FIG. 7 is a cross section of the thermally compliant grommet assembly taken along line 7-7 of FIG. 6.

In operation, the grommet assembly 101 is exposed to surrounding ambient temperatures and may then be exposed to greatly elevated temperature. For example, during engine operation, the heat shell 80 may heat to about 2,200 degrees Fahrenheit or hotter while the support shell 76 may only heat to about 1,000 degrees Fahrenheit. Heating of the shell materials will cause thermal growth. The greater temperature of the heat shell 80 may cause more thermal growth than that of the support shell 76 exposed to the lesser temperature. The assembly 101 (or heat shell 80) thus has a cold state 158 (see FIGS. 4 and 5) and a hot state 160 (see FIGS. 6 and 7) where the shells 76, 80 move with respect to one-another.

This shell movement is generally along a thermal growth path 162 that is generally normal to and intersects the centerlines 116, 122, 134. The thermal growth path 162 may further be linear (i.e. a vector in a cylindrical coordinate system) that intersects a kingpin 164 used to secure and support the heat shell 80 to the support shell 76 (not shown). Because (at least in-part) of the temperature difference between the shells 76, 80, there is a thermal growth differential between the shells and along the thermal growth path 162 that will offset the grommet 102 with respect to the hole 120 in the support shell 76. That is, and using the support shell as a reference point (i.e. assuming a stationary reference point), the centerline 134 of the grommet 102 will move by a thermal displacement distance 166 (see FIG. 6) along the thermal growth path 162 as the assembly 101 shifts between the cold and hot states 158, 160. The distance 166 may generally increase with grommet assemblies 101 located further from the associated kingpin 164 due to greater thermal growth.

Because it is the desire to maintain a minimum and continuous sealing contact area between the surface 138 of the flange portion 128 and the inner side 110 of the support shell 76 regardless of whether the grommet assembly 101 is in the cold or hot states 158, 160, the larger flange segments 144, 146 project along the thermal growth path 162, and the flange truncated segments 148, 150 generally project outward and normal to the path. As previously described, the portion of the peripheral face 142 at the truncated portions 148, 150 of the flange portion 128 may be substantially linear and generally run parallel to or silhouette the thermal growth path 162 at a substantially equal distance 154. Generally, the radius 152 of the flange segments 144, 146 may be about equal to the minimum distance 154 plus the thermal displacement distance 166.

Alternatively, the flange portion 128 may be oblong or oval (as generally defined by the peripheral face 142) and elongated along the thermal growth path 162 as long as a minimum sealing contact area is maintained Regardless of the specific shape of the truncated segments 148, 150, the truncation reduces unwanted weight and thermal mass while maintaining the necessary sealing area that segregates the cooling cavity 112 from the dilution hole 132.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed is:

1. A grommet assembly, comprising:
   a first shell;
   a second shell spaced from the first shell and including a hole having a centerline;
   a kingpin for securing the first shell to the second shell;
   a grommet including a tubular portion projecting into the hole and defining a bore along a centerline through the first and second shells; and
   a thermal displacement path caused by a temperature difference between the first shell and the second shell, the thermal displacement path extending in a linear direction between the kingpin and the grommet bore centerline,
   wherein at least one of the first and second shells are configured for relative movement along the thermal displacement path such that the centerlines of the hole of the second shell and the bore of the grommet move relative to one another along the thermal displacement path,
   wherein the grommet includes a truncated flange portion disposed between the first and second shells and projecting outward from the tubular portion, and
   wherein the flange portion has truncated first and second segments that are substantially opposite to one-another and extend outward substantially normal to the thermal displacement path, and third and fourth segments that are substantially opposite to one-another, extend along the thermal displacement path, and generally project further outward from the tubular portion than the first and second segments.

2. The grommet assembly set forth in claim 1, wherein the centerlines are substantially parallel to one-another.

3. The grommet assembly set forth in claim 1, wherein the centerlines are substantially normal to the thermal displacement path.

4. The grommet assembly set forth in claim 1, wherein the truncated flange portion is in sliding and circumferentially continuous, sealing, contact with the second shell during relative movement of the first and second shells between cold and hot states.

5. The grommet assembly set forth in claim 4, wherein the grommet is rigidly engaged to the first shell.

6. The grommet assembly set forth in claim 4, wherein a continuous surface carried by the second shell defines the hole and is spaced radially outward from the tubular portion when at least one of the first and second shells are in the cold and hot states.

7. The grommet assembly set forth in claim 1, wherein the grommet is a dilution hole grommet and the bore is a dilution hole.

8. The grommet assembly set forth in claim 1, wherein the flange portion extends continuously around the tubular portion.

9. The grommet assembly set forth in claim 1, wherein a continuous surface carried by the second shell defines the hole and has a radius measured from the centerline of the hole,
   wherein the flange portion includes a circumferentially continuous outer face between the first and second shells and carried by the first, second, third and fourth segments, and
   wherein a minimum distance between a portion of the face carried by one of the truncated first and second segments and the centerline of the bore is less than a second radius of the third and fourth segments as measured from the centerline of the bore to the face carried by one of the third and fourth segments.

10. The grommet assembly set forth in claim 9, wherein the second radius exceeds the minimum distance by at least a maximum offset distance between the centerlines of the hole of the second shell and the bore of the grommet during relative movement of the first and second shells along the thermal displacement path.

* * * * *

UNITED STATES PATENT AND TRADEMARK OFFICE
CERTIFICATE OF CORRECTION

PATENT NO. : 10,112,557 B2
APPLICATION NO. : 14/678437
DATED : October 30, 2018
INVENTOR(S) : Sandoval et al.

It is certified that error appears in the above-identified patent and that said Letters Patent is hereby corrected as shown below:

In the Specification

Column 4, Line 57, please replace "(T/518.7)" with "(T/518.7$^{0.5}$)".

Signed and Sealed this
Eleventh Day of December, 2018

Andrei Iancu
*Director of the United States Patent and Trademark Office*